United States Patent [19]

Kalfoglou

[11] 4,129,183

[45] Dec. 12, 1978

[54] USE OF ORGANIC ACID CHROME COMPLEXES TO TREAT CLAY CONTAINING FORMATIONS

[75] Inventor: George Kalfoglou, Houston, Tex.

[73] Assignee: Texaco Inc., New York, N.Y.

[21] Appl. No.: 811,804

[22] Filed: Jun. 30, 1977

[51] Int. Cl.² .................. E21B 43/22; E21B 43/24
[52] U.S. Cl. .................. 166/300; 166/270;
166/272; 166/274; 166/303; 166/305 R
[58] Field of Search ............... 166/270, 272, 274, 275,
166/288, 294, 300, 303, 305 R; 252/8.55 R, 8.55 D

[56] References Cited

U.S. PATENT DOCUMENTS

| 2,356,161 | 8/1944 | Iler .......................... 252/8.55 D X |
| 3,491,833 | 1/1970 | Braden, Jr. .................... 166/272 |
| 3,603,396 | 9/1971 | Braun .......................... 166/303 X |
| 3,614,986 | 10/1971 | Richardson ................... 166/300 X |
| 3,669,188 | 6/1972 | Coles et al. ..................... 166/270 |
| 3,807,500 | 4/1974 | Thigpen, Jr. et al. ............. 166/303 |
| 3,843,524 | 10/1974 | Perricone et al. ........... 166/305 R X |
| 3,915,727 | 10/1975 | Sparlin et al. ................... 166/294 X |

FOREIGN PATENT DOCUMENTS 492647   5/1953   Canada ..................................... 166/294

OTHER PUBLICATIONS

Slobod, "Restoring Permeability to Water-Damaged Pays", Oil and Gas Journal, vol. 68, No. 5, 2/70, pp. 104-108.

Primary Examiner—Ernest R. Purser
Assistant Examiner—George A. Suchfield
Attorney, Agent, or Firm—Carl G. Ries; Thomas H. Whaley

[57] ABSTRACT

The instant invention is concerned with the use of organic acid chrome complexes for stabilizing a formation against clay swelling and particle migration and, in one embodiment, to improve oil recovery by rendering watered out channels within a produced formation water repellent and oil wettable.

7 Claims, 1 Drawing Figure

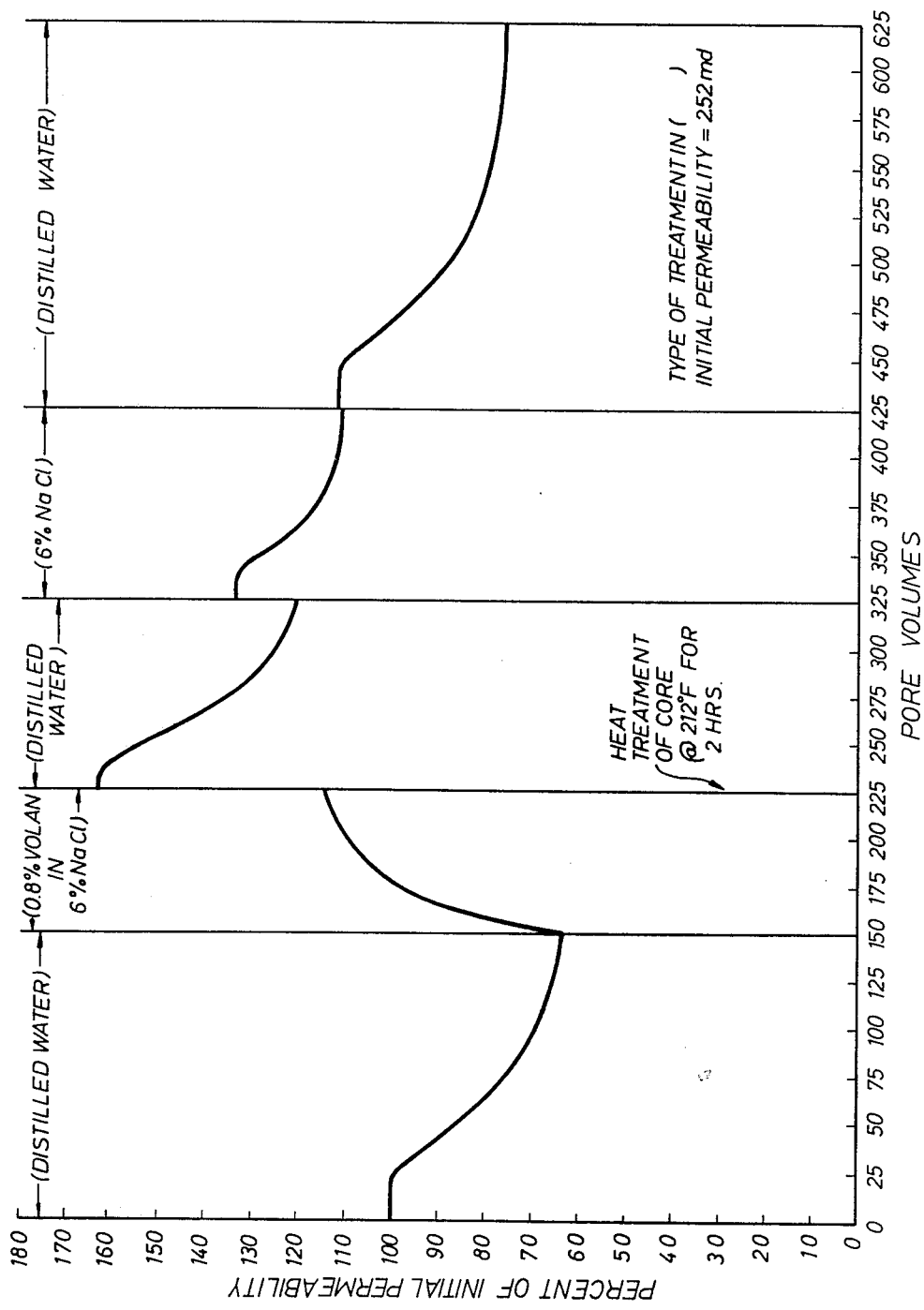

USE OF ORGANIC ACID CHROME COMPLEXES TO TREAT CLAY CONTAINING FORMATIONS

BACKGROUND OF THE INVENTION

This invention relates to a method of treating a subterranean formation containing clay to stabilize the formation against clay-swelling and particle migration comprising: contacting said clay with an aqueous solution of a chrome complex of the Werner-type in which trivalent chromium atoms are coordinated with a carboxylic acido ligand, to form a polynucleated chrome complex on the clay surface.

Many oil bearing formations contain clays of different types and of varying amounts. Permeability losses in these formations can occur when the clays obstruct flow by swelling or dispersing. Clays may hydrate in the presence of water and obstruct flow or clay particles may migrate and obstruct flow.

Generally, the technique of water flooding which is so often used in secondary recovery processes causes swelling and dispersing of hydratable clays, such as montmorillonite. Hydration or swelling of clays is caused by the affinity of inter-layer clay surfaces and cations found on those surfaces for water. Organic cations such as amines have been used to reduce the tendency of clays to hydrate by replacing the clay cations with cations having a lower water affinity. This treatment is both an expensive and a temporary solution to the problem. After a period of time the organic cations are displaced from the clay surfaces and the clays are rendered hydratable once again.

Most clay surfaces have an inherent negative charge. Absorption of cations on the surface will neutralize the negative charge. Multilayered clay particles will tend to repel each other and disperse. However, the more firmly attached cations are to the surface, the lower the tendency of the clay particles to disperse.

Clay surfaces have been treated with multivalent cations such as calcium in order to reduce the tendency of the clay particles to disperse; however, such treatments are only a temporary remedy since the clays will revert to a sodium type when contacted with reservoir brines.

Two major and distinct problems may occur during secondary recovery processes in clay containing formations. The first occurs in secondary recovery processes in which water flooding is utilized to drive or sweep oil from an injection well to a production well. The formation around the injection well may contain swellable clays and if so, those clays can swell and obstruct the continued injection of water. The other problem results when the secondary recovery method of water flooding has been utilized. Generally, it results from the water taking the path of least resistance through the formation and forcing oil out of those channels. As the water approaches the production well, continued injection of water produces no oil since the water will tend to flow through the watered-out channels.

Several methods for treating subterranean formations containing swellable clays have been disclosed. For example, U.S. Pat. No. 3,603,396 discloses a method for increasing the permeability of a subterranean formation which, in pertinent part, comprises dehydrating at least a portion of the formation and contacting at least a portion of that dehydrated formation with a hydration stabilizer selected from the group consisting of sodium nitrate, calcium nitrate, calcium chloride, zinc chloride, sodium silicate, sodium methyl siliconate, and a vinyl ether polymer having a molecular weight from about 300,000 to about 8 million.

U.S. Pat. No. 3,603,399 discloses a method of treating a water sensitive formation by contacting it with a hydroxy-aluminum solution having a ratio of hydroxyl groups to aluminum atoms in the range of 1.5 to 2.7. Alkali or an alkaline base must be added with the aluminum compound and the two may be mixed on the surface or in the formation.

U.S. Pat. No. 2,273,040 discloses a water soluble complex compound of the Werner-type in which trivalent nuclear chromium atoms are coordinated with acyclic carboxylic acido groups having at least 10 carbon atoms. It was indicated that the compounds were useful to increase the hydrophobic properties of surfaces. In particular, it was disclosed that the compounds were useful in the treatment of clay or silicious material and in oil well treatment to render those clays or sands water repellent and more readily wettable by oils even in the presence of water.

Other patents have disclosed the treatment of formations containing swellable clays: U.S. Pat. No. 3,382,924 discloses the treatment of earthen formations comprising argillaceous materials and U.S. Pat. No. 3,621,913 concerns the treatment of clay-containing formations with an aqueous solution of aluminum salt.

In summary, many compounds including sodium, calcium, zinc, aluminum and zirconium have been described as useful in treating formations containing hydratable clays. However, these treatments have shortcomings.

For example, the compounds disclosed in U.S. Pat. No. 2,273,040 are not useful in preventing plugging at the injection well during water flooding because the fatty acid radicals of the carboxylic acido ligands are described as having at least 10 carbon atoms and such long carbon chains would render the treated surfaces oil wettable. Such a surfce would tend to restrict water injection during a subsequent water flooding treatment.

Treatments which use zirconium compounds are costly and are difficult to control since the zirconium compounds must be kept at a low pH in order to be stable in water. Aluminum compounds present the same type of pH control difficulties. In addition to closely controlling pH, when using either zirconium or aluminum compounds all the variable conditions must be closely controlled.

What is required is a method for treating formations containing hydratable clays which is efficient, economic, and useful for solving both injection well plugging problems and watered-out channel problems.

SUMMARY OF THE INVENTION

The instant invention is concerned with the use of organic acid chrome complexes for stabilizing a formation against clay swelling and particle migration and, in one embodiment, to improve oil recovery by rendering watered out channels water repellent and oil wettable.

In this regard the invention provides novel methods of treatment of subterranean formations. In particular, the methods of this invention provide treatment techniques which may be employed in connection with secondary recovery techniques which utilize water flooding to sweep oil from an injection well to a production well.

In accordance with one aspect of this invention it has been found that an aqueous solution of a chrome complex of the Werner-type in which trivalent chromium atoms are coordinated with a carboxylic acido ligand containing two to eight carbon atoms can be utilized to treat subterranean formations to render them stable against swelling and particle migration while retaining and at times enhancing water permeability of the formation.

In accordance with a second aspect of this invention it has been found that similar chromium complexes, when coordinated with an acido ligand of six to 20 carbon atoms may be employed to render clays impermeable to water penetration.

It has been further found that the chrome complexes may be stabilized for better adherence to the clay surfaces in the presence of brine solutions, by heating and drying the formation. Polynucleation of the complexes on the clay surface may be controlled by varying the pH of the aqueous solution, thus enabling control of the treatment procedure.

Specifically, the novel methods of this invention involve treating a subterranean formation in connection with a secondary recovery method wherein water flooding is used to drive crude petroleum stock in a subterranean formation from one or more injection wells to one or more production wells. In connection with such methods, the formations around the injection wells may be treated to inhibit clay swelling and particle migration, while retaining water permeability of the formation, by contacting said formations with an aqueous solution of a chrome complex of the Werner-type in which chromium atoms are coordinated with a short chain carboxylic acido ligand containing about two to eight carbon atoms. In further assistance of water flooding secondary recovery techniques, injections of similar chrome compounds having a longer chain length carboxylic acido ligand, e.g., eight to 20 carbon atoms, can be injected into formations surrounding a production well to establish a water repellent surface on wateredout channels within the formation to force subsequent water floods to be diverted from those watered out channels and sweep the productive regions of the formation.

DESCRIPTION OF PREFERRED EMBODIMENTS

The treatment of subterranean formations prior to water flooding is accomplished by contacting the formation with an aqueous solution of a chrome complex of the Werner-type having a pendant hydrocarbon radical, the length of which will determine the hydrophobicity which the surface exhibits following treatment. Following injection of the chrome complex solution, polynucleation of the chrome complex on the clay surface is permitted to proceed by aging, i.e., maintaining the contact between the solution and the formation in a static condition. Adjustment of the pH of the solution can also affect polynucleation. Finally, the polynucleated chrome complex may be cured on the clay surface to provide the clay with surface characteristics of the desired hydrophobicity which will be resistant to brine or salt solutions which may later contact the formation.

Chrome complexes of the type employed in this invention are generally well-known. They are water soluble Werner-type chrome complexes coordinated with ligand of a carboxylic acid. These complexes are capable of reacting with polar groups on hydrophobic surfaces. The chrome material dries to form a polymeric complex which acts as an insoluble sizing material firmly attached to the substrate through covalent bonds and polar forces. The hydrocarbon radicals of the organic acido ligands are oriented away from the substrate surface, and hence the hydrophobicity of the surface after treatment can be controlled by selection of the size of the acido ligand coordinated with the complex. A longer chain length ligand imparts greater hydrophobicity and water repellency to the surface. The polymeric complex on the substrate is not in the form of a continous film over the surface, however.

In carrying out the methods of this invention, the chrome complex is preferably diluted in an aqueous solution to provide a solution containing about 0.2 to 20 percent by weight of the chrome complex. More typically, aqueous solutions between about 0.5 and 10.0 percent by weight are employed.

In the preferred embodiment, the chrome complexes utilized in the practice of the instant invention are those commercialized by duPont and sold as the Volan and Quilon series. Volan is a methacrylato chromic chloride. Volan L is a methacrylato chromic chloride which has a reduced chloride content. Quilon M is a myristato chromic chloride. Quilon S is a stearato chromic chloride and Quilon C is a chromium compound prepared by a special process. The physical properties of these compounds as published in duPont's brochures are listed in Table I.

TABLE I

| Compound | Density/ Specific Gravity[1] | pH[2] | Point[3] °F | Color |
|---|---|---|---|---|
| Volan | 1.02 | 3.4 | 60 | dark-green |
| Volan L | 0.95 | 3.5 | 60 | dark-green |
| Quilon C | 0.995 | 2 | 42 | blue-green |
| Quilon M | 0.935 | 2 | 24 | green |
| Quilon S | 0.947 | 2 | 24 | green |

[1]Volan Series - specific gravity at approx. 20° C  Quilon Series - density (g/cc)
[2]Volan Series - pH of 1% water solution
[3]Volan Series - Cleveland Open Cup  Quilon Series - Tag O.C.

The chrome complexes which may be utilized in accordance with the method of the instant invention are water soluble coordination compounds of chromium which have a carboxylic acido ligand. According to duPont brochures on the chrome complexes of the Volan series, in an isopropyl alcohol solution the chrome complex has the following structure:

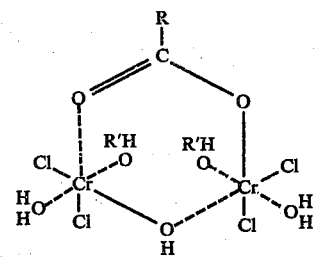

Where R represents a fatty acid radical having from 13 to 17 carbon atoms.

When the chrome complex is diluted with water the coordinated alcohol groups and some of the chlorine atoms are replaced by water, and the chrome complex has the following structure:

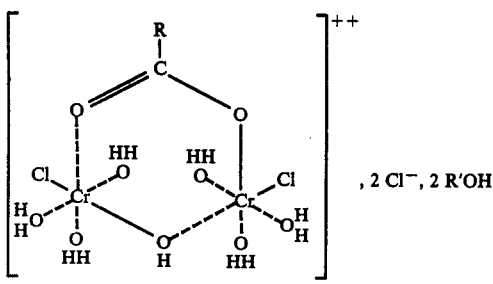

Where R represents a fatty acid radical having from 13 to 17 carbon atoms.

Subsequent hydrolysis by aging or neutralization with, for example, a weak base buffer solution results in polynucleation of the chrome complexes which then have the following structure:

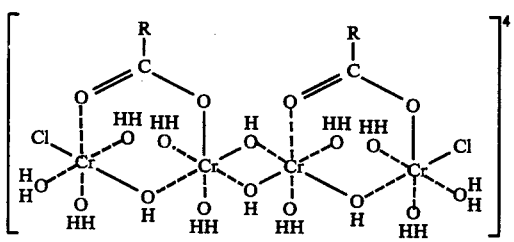

Where R represents a fatty acid radical having from 13 to 17 carbon atoms.

Hydrolysis or neutralization of the chrome complexes causes the aquo groups to loose protons and form hydroxyl bridges which results in the molecules increasing in size. As polynucleation continues the chrome complexes increase in size and the net positive charge also increases. This high positive charge and the hydrogen bonding capability of the hydroxyl bridges causes these complexes to adsorb on negatively charged surfaces such as clays and, to a lesser extent, silicates.

Heating of the clay surfaces having the chrome complex on their surfaces, drives water from the complex and further polynucleates the complex. The dried complex has the following structure:

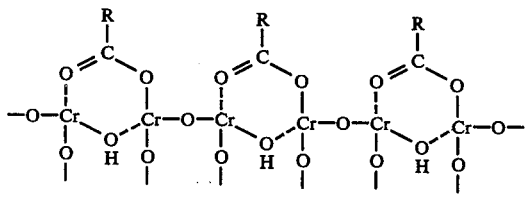

And where R represents a fatty acid radical having from 13 to 17 carbon atoms.

The above illustrated formulas represent those which duPont has illustrated in its Volan Series brochure. The chrome complexes of the Volan Series are compounds in which the chromium atoms are coordinated with carboxylic acids having fatty acid radicals containing from 13 to 17 carbon atoms; however, it should be understood that the instant invention is not limited to those carboxylic acids.

In accordance with the instant invention many different types of chrome complexes may be utilized depending on the particular result required. If the formation containing the treated clay is to be water permeable then the chrome complex utilized should not be one which contains a carboxylic acid with a hydrocarbon ligand which would repel water. Accordingly, the hydrocarbon ligand should contain from about two to about eight carbon atoms and, preferably, from about two to about four carbon atoms.

Similarly, if that portion of the formation treated is to be rendered water impermeable then the chrome complex utilized should be one which contains a carboxylic acid with a hydrocarbon ligand which would repel water. In such an instance, the hydrocarbon ligand should contain from about six to about 20 carbon atoms and, preferably, from about 13 to about 20 carbon atoms.

It should be understood by those of skill in the art that there is not a sharp division between the number of carbons in the hydrocarbon ligands of an organic acid which cause some acids to be hydrophobic and others to be hydrophilic. Accordingly, as a general rule, carboxylic acids having hydrocarbon radicals containing at least six carbon atoms have a slight water repellant characteristic and the degree of water repellancy increases in proportion to the number of carbon atoms. Similarly, carboxylic acids having hydrocarbon radicals containing at least eight carbon atoms have a slight water repellant characteristic and the degree of that water repellant characteristic decreases in proportion to a reduction in the number of carbon atoms.

The organic acids which are coordinated with the chromium atoms to form the chrome complexes useful in the practice of the method of the instant invention may have hydrocarbon ligands which are aliphatic, aromatic, branched or straight chain, saturated, or unsaturated.

The chrome complexes useful in accordance with the instant invention are employed in an aqueous solution. The stability of these aqueous solutions depends upon the particular chrome complex utilized, its concentration, the pH and temperature of the solution. Some of the chrome complexes, for example the Quilon series, are sensitive to polyvalent anions such as phosphate and sulfate; however, amounts to these anions usually present in hard water are tolerable. Also, salts of hydrochloric, formic and acetic acids do not have a significant effect on stability.

Aqueous solutions containing chrome complexes become more acidic on aging because the complex hydrolyzes and polymerizes with a release of protons. The polymerization rate increases with increased dilution, pH, and temperature. Solution instability is evidenced by sludge formation. Sludge formation increases with increase in pH and is instantaneous at pH values above 6.

Generally, netralization of the aqueous chrome complex solution is required if the water is not sufficiently alkaline to give the solution a pH of about 3 – 3.5. Preferred neutralizing agents are dilute ammonia, hexamethylenetetramine and urea or a urea-formate solution. The urea-formate solution may be made by admixing 16.5 pounds of urea, 5.0 pounds of sodium formate and 0.2 pounds of a 90% formic acid solution in 78.3 pounds of water. Use of this solution minimizes the need for controlling the pH of the aqueous chrome complex solution.

Generally, an aqueous solution of a chrome complex prepared and kept at room temperature will remain stable for 24 hours. Stability is even longer at temperatures of between 70°-80° F. Higher temperatures decrease stability; for example, at 110° F., stability is approximately 8 hours. To avoid this loss of stability in short periods of time, the solutions should be cooled when temperatures are expected to exceed 110° F.

Also, heat accelerates the adherence of chrome complexes on the substrate surface. Generally, the solution can be heated in situ at temperatures ranging from about 140° to about 250° F. and preferably from about 150° to about 212° F. The heating temperature will vary depending on many factors such as the particular chrome complex utilized, its concentration, the substrate treated and the temperature of the substrate. In accordance with this invention, a dry inert gas such as nitrogen may be heated to a suitable temperature and passed through the formation in order to heat the chrome complex to the desired temperature. Typically, the gas is heated to 212° F. and passed through the formation in order to dry and fully cure the chrome complexes.

As previously indicated, in the preferred embodiment of this invention, an aqueous solution of Volan (1 wt. %) is injected into the formation to be treated through an injection well prior to a water flooding step in order to prevent clay swelling and particle migration. An approximate amount of clay to be treated can be determined by core analysis or any other suitable method. It is preferred to treat the formation with a sufficient amount of the chrome complex such that the clay will be stabilized against hydration and particle migration. Generally, the volume of the chrome complex compound required is approximately 0.1 to 4.0 volume percent of the clay volume to be treated.

Following the injection, it is preferred that the well be shut in for a sufficient amount of time for polynucleation to take place and, if desired, a minor amount of a weak base buffer solution may be added to aid in this process. Preferably, a heated inert gas such as nitrogen is introduced into the formation via the injection well in order to dry and fully cure the chrome complex. This heating step serves to drive water from the complex and assures the effectiveness of the clay stabilization. The heated gas may be introduced at a temperature of about 212° F., it being understood that gas at higher or lower temperatures may be used.

When treating the formation around the injection well, it is desirable to stabilize (coagulate) the hydratable clays without rendering that portion of the formation treated water impermeable. Accordingly, the chrome complex utilized should have a carboxylic acido ligand which has a relatively small number of carbon atoms in the hydrocarbon radical. The number of carbon atoms may be from two to eight, with from two to four preferred.

When the pore volume of the formation treated is large, then a chrome complex having a carboxylic acido ligand with as many as eight carbon atoms may be utilized without appreciably affecting the water permeability of the treated formation. However, when the pore volumes are smaller it is desirable to use a chrome complex having a carboxylic acido ligand with a smaller number of carbon atoms since a higher number of carbon atoms may have more of an affect on water permeability when pore volumes are small than when they are large.

Generally, when treating a formation the treating solution should be in contact with the clay from about 1 to about 7 days depending on many factors such as the chrome complex and, whether neutralization is used, and solution concentration. The volume of solution required depends on the type and volume of clay to be treated, formation porosity and surface area. Generally, the amount of chrome complex required is from 0.1 to 4. percent of the volume of clay to be treated.

In another embodiment of the instant invention, watered out channels may be rendered oil soluble and water repellent by treating them with chrome complexes with a carboxylic acido ligand having a hydrocarbon radical consisting of from 6 to about 20 carbon atoms and preferrably from 13 to about 20. After the injection of an effective amount of the chrome complex through the production well, the treatment may proceed in a fashion similar to that utilized in treating the injection well.

Care must be taken when treating the watered-out channels so that the clay formation adjacent the injection well is not treated. It is desirable not to treat the formation around the injection well in this embodiment in order to avoid interfering with a subsequent water flooding procedure.

For example, this may be avoided by first treating the formation around the injection well through the injection well with an aqueous solution of a chrome complex having a carboxylic acido ligand with a small number of carbon atoms. After this treatment, the watered-out channels could be treated through the production well with a chrome complex having a carboxylic acido ligand with a large number of carbon atoms. This way only the watered out channels would be rendered water impermeable and the formation around the injection well would remain water permeable.

By rendering the watered out channels water impermeable, water injected during a subsequent flooding process will be forced into new channels. Hence, any oil in those channels, which without the treatment of the instant invention would have remained in the formation, can be recovered. Of course, the number of carbon atoms in the carboxylic acido ligand required to effect the desired water impermeability change will vary depending on the formation porosity.

If the formation has a very small porosity then a small carbon chain having about 8 carbon atoms may be effective. However, with a higher porosity, a carboxylic acido ligand having a greater number of carbon atoms is required. Generally, when treating watered out channels the carboxylic acido ligand may have a fatty acid radical having from eight to 20 carbon atoms and, preferably from 13 to 20.

Generally, the methods of this invention may be employed in any suitable formation having at least two wells drilled into and communicating with that portion of the formation containing hydrocarbons.

The quantities and concentrations of the solutions to be used may be determined in accordance with methods well-known in the art and by a routine amount of experimentation. The following experiments are examplary:

EXPERIMENTS

A series of experiments were run to demonstrate the irreversible clay coagulating properties of the chrome complexes. In examples 1-12 the aqueous chrome complex solutions were prepared by admixing distilled water with varying amounts of each compound. In experiments 13-25 the aqueous chrome complex solutions were prepared by admixing an aqueous 6.0 Wt. %

NaCl solution with varing amounts of each chrome complex compound.

In all examples 15 millimeter centrifuge tubes were filled with 0.2 grams of dry bentonite and in each example the bentonite was contacted with 10 milliliters of the chrome complex solution. After this the tubes were centrifuged for 15 minutes at 28000 rpm and clay volume was observed. These steps of centrifuging and observing clay volume were repeated until equilibrium was reached. This equilibrium volume was observed and is recorded for each concentration of solution tested under the first clay volume measurement column of Tables II-VI.

Next, the clay in each centrifuge tube was heat treated at 212° F. for 2 hours and the clay volumes were observed after centrifuging for 15 minutes at 2800 rpm.

After this each sample was subjected to the following: two cycles of exposure to 10 ml of distilled water, one cycle of exposure to 10 ml of a 6% NaCl solution and 5 cycles of exposure to distilled water. After each of these cycles the tubes were centrifuged for 15 minutes at 2800 rpm and the clay volume was observed, and is recorded under the appropriate columns in Tables II-VI.

In examples 21-25, the same procedures as described above were followed except, the clays were not heat treated. Also, it should be noted that example 21 did not contain any of the chrome complex compound and the number recorded under the column "Volan in 6% NaCl" reflects the equilibrium clay volume (cc) after centrifuging and after the clay was exposed to 10 ml of a 6 wt. % NaCl solution.

TABLE II

| Ex. | Concentration of Treating Solution wt. % Quilon M | Quilon M | Heat Treating Solids at 212° F | Clay Volume (cc) (after treatment and centrifuging) | | | | | | | |
|---|---|---|---|---|---|---|---|---|---|---|---|
| | | | | Dist. Water | Dist. Water | NaCl 6% | Dist. Water | Dist. Water | Dist. Water | Dist. Water | Dist. Water |
| 1 | 0.6 | 1.80 | 0.30 | 0.30 | 0.35 | 0.35 | 0.35 | 0.35 | 0.36 | 0.38 | 0.40 |
| 2 | 0.8 | 1.65 | 0.28 | 0.28 | 0.30 | 0.30 | 0.35 | 0.38 | 0.38 | 0.38 | 0.40 |
| 3 | 1.0 | 1.60 | 0.37 | 0.28 | 0.28 | 0.25 | 0.25 | 0.25 | 0.25 | 0.24 | 0.30 |
| 4 | 2.0 | 1.35 | 0.25 | 0.25 | 0.25 | 0.25 | 0.25 | 0.25 | 0.25 | 0.25 | 0.30 |

TABLE III

| Ex. | Concentration of Treating Solution wt. % Quilon S | Quilon S | Heat Treating Solids at 212° F | Clay Volume (cc) (after treatment and centrifuging) | | | | | | | |
|---|---|---|---|---|---|---|---|---|---|---|---|
| | | | | Dist. Water | Dist. Water | NaCl 6% | Dist. Water | Dist. Water | Dist. Water | Dist. Water | Dist. Water |
| 5 | 0.6 | 1.80 | 0.30 | 0.30 | 0.35 | 0.35 | 0.35 | 0.40 | 0.40 | 0.40 | 0.40 |
| 6 | 0.8 | 1.60 | 0.25 | 0.25 | 0.25 | 0.25 | 0.30 | 0.35 | 0.40 | 0.40 | 0.40 |
| 7 | 1.0 | 1.60 | 0.30 | 0.30 | 0.30 | 0.30 | 0.30 | 0.30 | 0.30 | 0.30 | 0.30 |
| 8 | 2.0 | 1.50 | 0.30 | 0.30 | 0.30 | 0.30 | 0.30 | 0.30 | 0.30 | 0.30 | 0.30 |

TABLE IV

| Ex. | Concentration of Treating Solution wt. % Quilon C | Quilon C | Heat Treating Solids at 212° F | Clay Volume (cc) (after treatment and centrifuging) | | | | | | | |
|---|---|---|---|---|---|---|---|---|---|---|---|
| | | | | Dist. Water | Dist. Water | NaCl 6% | Dist. Water | Dist. Water | Dist. Water | Dist. Water | Dist. Water |
| 9 | 0.6 | 1.35 | 0.25 | 0.25 | 0.25 | 0.25 | 0.28 | 0.30 | 0.30 | 0.30 | 0.30 |
| 10 | 0.8 | 1.25 | 0.25 | 0.25 | 0.25 | 0.25 | 0.25 | 0.25 | 0.25 | 0.25 | 0.25 |
| 11 | 1.0 | 1.40 | 0.30 | 0.30 | 0.30 | 0.30 | 0.30 | 0.30 | 0.30 | 0.35 | 0.35 |
| 12 | 2.0 | 1.30 | 0.30 | 0.30 | 0.30 | 0.30 | 0.35 | 0.35 | 0.35 | 0.35 | 0.35 |

TABLE V

| Ex. | Concentration of Treating Solution wt. % Quilon C (precured chrome complex) | Quilon C in 6% NaCl | Heat Treating Solids at 212° F | Clay Volume (cc) (after treatment and centrifuging) | | | | | | | |
|---|---|---|---|---|---|---|---|---|---|---|---|
| | | | | Dist. Water | Dist. Water | NaCl 6% | Dist. Water | Dist. Water | Dist. Water | Dist. Water | Dist. Water |
| 13 | 0.6 | 0.60 | 0.70 | 0.99 | 0.99 | 0.70 | 0.85 | 0.99 | 0.99 | 0.98 | 0.99 |
| 14 | 0.8 | 0.56 | 0.60 | 0.73 | 0.85 | 0.62 | 0.70 | 0.79 | 0.79 | 0.79 | 0.78 |
| 15 | 1.0 | 0.55 | 0.53 | 0.60 | 0.60 | 0.53 | 0.68 | 0.65 | 0.65 | 0.66 | 0.66 |
| 16 | 2.0 | 0.54 | 0.45 | 0.45 | 0.45 | 0.44 | 0.43 | 0.43 | 0.43 | 0.45 | 0.45 |

TABLE VI

| Ex. | Concentration of Treating Solution in (wt. % Volan) | Volan Solids 6% NaCl | Heat Treating Dist. at 212° F | Clay Volume (cc) (after treatment and centrifuging) | | | | | | | |
|---|---|---|---|---|---|---|---|---|---|---|---|
| | | | | Dist. Water | NaCl Water | Dist. 6% | Dist. Water | Dist. Water | Dist. Water | Dist. Water | Water |
| 17 | 0.6 | 0.52 | 1.4 | 2.0 | 1.5 | 0.75 | 1.00 | 0.98 | 0.98 | 0.90 | 0.89 |
| 18 | 0.8 | 0.50 | 1.0 | 1.8 | 1.4 | 0.82 | 1.10 | 1.10 | 0.90 | 0.88 | 0.85 |
| 19 | 1.0 | 0.50 | 0.9 | 1.5 | 1.2 | 0.82 | 1.05 | 1.05 | 0.95 | 0.90 | 0.85 |
| 20 | 2.0 | 0.49 | 0.6 | 0.7 | 0.7 | 0.60 | 0.70 | 0.70 | 0.70 | 0.65 | 0.65 |

TABLE VII

| Ex. | Concentration of Treating Solution wt. % Quilon C (precured chrome complex) | Clay Volume (cc) (after treatment and centrifuging) | | | | | | |
|---|---|---|---|---|---|---|---|---|
| | | Volan in 6% NaCl | Dist. Water | Dist. Water | NaCl 6% | Dist. Water | Dist. Water | Dist. Water |
| 21 | 0 | 0.47 | 9.50 | 10.0 | — | — | — | — |
| 22 | 0.6 | 0.48 | 0.46 | 0.50 | 0.43 | 1.20 | 5.80 | 10.0 |
| 23 | 0.8 | 0.48 | 0.44 | 0.57 | 0.42 | 0.90 | 8.20 | 10.0 |
| 24 | 1.0 | 0.49 | 0.45 | 0.51 | 0.45 | 1.00 | 6.50 | 10.0 |
| 25 | 2.0 | 0.50 | 0.46 | 0.50 | 0.49 | 0.90 | 7.50 | 10.0 |

Generally, clays coagulated with simple metal ions such as calcium and then exposed to an NaCl solution, disperse in the presence of distilled water. Also, as illustrated in example 21, clays not treated with a chrome complex compound will hydrate after exposure to a brine solution and several cycles of distilled water. In contrast, the results of the above-described experiments illustrate the effectiveness of stabilizing (coagulating) clays irreversible by treatment with a solution of a chrome complex and heating the clays for 2 hours at 212° F. Further, the results indicate that treatment with the chrome complex is effective even in the presence of NaCl. Still further, the results in examples 22–25 indicate that the chrome complexes can stabilize clays against hydration even when not heat treated; however, the clays are not effectively stabilized without heat treatment when they are exposed to a brine solution. Accordingly, in formations containing brine solutions the chrome complexes should be heat treated in order to effectively stabilize the clays.

In another experiment, flow tests were conducted on a water sensitive core from the Sespe Zone formation, in order to determine whether treatment with chrome complexes to stabilize the clays would be effective against fresh water exposure and salt water exposure after an initial exposure to fresh water.

The treating fluid which was used was made by admixing an amount of Volan with a 6 weight percent aqueous NaCl solution to a final concentration of 0.8 Wt. % Volan.

The core was first exposed to 150 pore volumes of distilled water. This damaged core was then treated with the 0.8 wt. % Volan solution. The treatment was stopped after 25 pore volumes had been injected and the core was shut in for approximately 16 hours to allow for maximum coagulation of the clay. After this shut-in the core was treated with 50 pore volumes of the treating fluid. Next, nitrogen gas was injected to remove any excess treating solution and the core was heat treated at 212° F. for 2 hours. The heat treated clay was then exposed to 100 pore volumes of distilled water. After that, the core was exposed to 100 pore volumes of a 6.0 wt. % NaCl solution. Then the core was exposed to 200 pore volumes of distilled water.

Volan was used in this experiment so that the core would have a high water permeability. If a chrome complex having a long chain fatty acid radical had been used the core would have had a much lower water permeability. The treating solution contained 6 wt. % NaCl in order to demonstrate that chrome complexes can be effective in treating formations containing clay even in the presence of brines.

The results are shown in FIG. 1. The ordinant scale is a percent of initial permeability, with initial permeability being 100 percent. The abscissa scale is a cummulative measure of the pore volumes of liquid to which the core was exposed.

The results indicated that a water sensitive formation can be stabilized against clay swelling and particle migration by contacting clays in the formation with a solution containing a chrome complex.

The description of the particular and preferred embodiments was not intended to limit the scope of this invention. Various modifications of the disclosed embodiments, as well as other embodiments of the invention, may be apparent to persons skilled in the art upon reference to this disclosure. It is therefore, contemplated that the appended claims will cover any such modifications or embodiments as fall within the true scope of this invention.

What is claimed is:

1. A method of treating a subterranean formation containing hydratable clay to stabilize said formation against clay-swelling and particle migration comprising:
   contacting said clay within the formation with an aqueous solution of a chrome complex of the Werner-type in which trivalent chromium atoms are coordinated with a carboxylic acido ligand having a hydrocarbon radical containing two to eight carbon atoms to form a polynucleated chrome complex on the surface of the clay particles.

2. The method of claim 1 comprising the additional step of introducing a heated gas into the formation to dry said chrome complex.

3. The method of claim 2 wherein said hydrocarbon radical contains from two to four carbon atoms.

4. The method of claim 1 comprising the additional step of raising the pH of said aqueous solution.

5. A method of treating a subterranean formation containing hydratable clay to stabilize said formation against clay-swelling and particle migration comprising:
   contacting said clay within the formation with an aqueous solution of a chrome complex of the Werner-type in which trivalent chromium atoms are coordinated with a carboxylic acid ligand having a hydrocarbon radical containing two to four carbon atoms; and
   introducing a heated gas into the formation, to dry said chrome complex and to form a polynucleated chrome complex on the treated surface.

6. The method of claim 5 comprising the additional step of raising the pH of said aqueous solution by contacting said solution with a weak base buffer solution.

7. In a method of secondary recovery when a water flood is employed to force oil from a subterranean formation containing hydratable clay, the improvement comprising:
   introducing through an injection well a dilute solution of a chrome complex of the Werner-type in which trivalent chromium atoms are coordinated with a carboxylic acido ligand having a hydrocarbon radical containing two to four carbon atoms; and
contacting said clay with said solution to form a polynucleated chrome complex on the clay surface; heating said formation with a heated gas to dry said complex.

* * * * *